May 31, 1949.  J. M. O'MALLEY  2,471,974
WABBLER COUPLING

Filed Feb. 11, 1948  2 Sheets-Sheet 1

INVENTOR.
Joseph M. O'Malley
BY
Albert G. Blodgett
Attorney

May 31, 1949.　　　J. M. O'MALLEY　　　2,471,974
WABBLER COUPLING
Filed Feb. 11, 1948　　　2 Sheets-Sheet 2
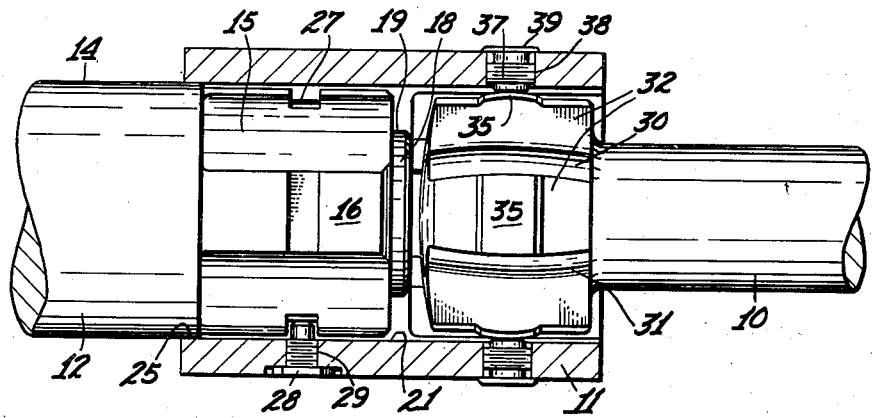
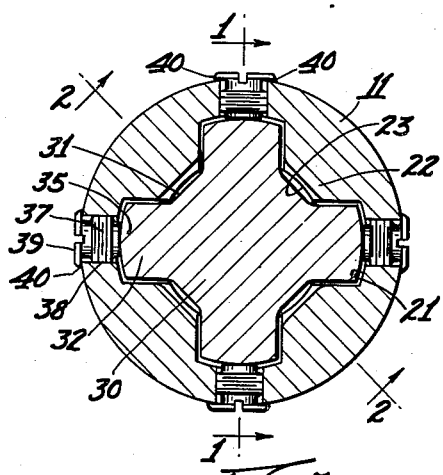
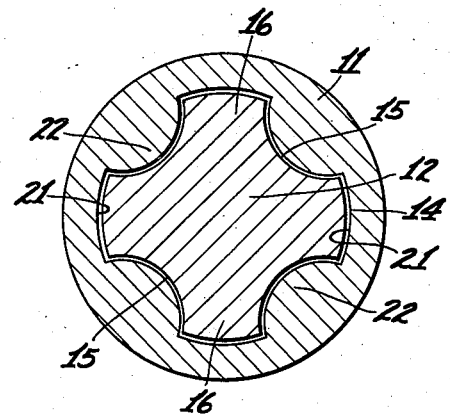
INVENTOR.
Joseph M. O'Malley
BY
Albert G. Blodgett
Attorney

UNITED STATES PATENT OFFICE 2,471,974

WABBLER COUPLING

Joseph M. O'Malley, Worcester, Mass., assignor to Morgan Construction Company, Worcester, Mass., a corporation of Massachusetts Application February 11, 1948, Serial No. 7,660

5 Claims. (Cl. 64—8)

This invention relates to wabbler couplings, and more particularly to the construction and arrangement of coupling spindles of the type used for connecting the roll necks in a rolling mill to the pinion shafts.

It has heretofore been a common practice to provide a spindle having fluted ends which are connected to the roll necks and pinion shafts by means of internally fluted sleeves. Since the flutes cannot be machined except at great trouble and expense, they have ordinarily been left rough, ample clearance being provided to allow ready assembly of the parts. Because of this clearance, the sleeve has not been properly centered on the other parts, and in operation there has frequently been considerable vibration and noise, with severe wear on the contacting surfaces.

It is accordingly one object of the invention to provide a wabbler coupling of simple and inexpensive construction which will operate throughout a long life of useful service without appreciable vibration and noise.

It is a further object of the invention to provide a wabbler coupling having readily machinable surfaces so located as to center the various parts accurately and thereby avoid excessive vibration and noise during operation.

With these and other objects in view, as will be apparent to those skilled in the art, the invention resides in the combination of parts set forth in the specification and covered by the claims appended hereto.

Referring to the drawings illustrating one embodiment of the invention and in which like reference numerals indicate like parts, Fig. 1 is a longitudinal section through a wabbler coupling the section being taken on the line 1—1 of Fig. 5;

Fig. 3 is a view similar to Fig. 1, with the roll neck and spindle shown in elevation instead of in section;

Fig. 4 is a section taken on the line 4—4 of Fig. 1; and

Fig. 5 is a section taken on the line 5—5 of Fig. 1.

Figure 1:
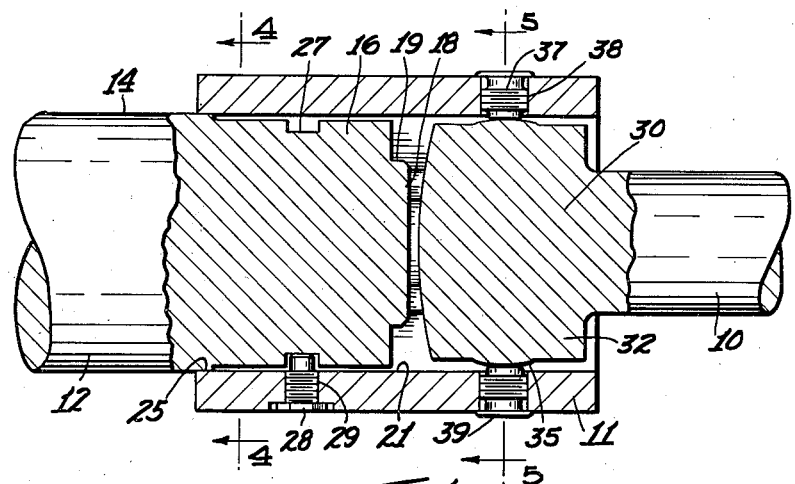

The embodiment illustrated comprises a spindle 10, one end of the spindle being connected by means of a sleeve 11 to a rotatable member or element in the form of a roll neck 12. It will be understood that the other end of the spindle may be similarly connected to a second rotatable element, such as a pinion shaft (not shown). Since rolling mill rolls must be adjusted in position, whereas the pinion shafts rotate about fixed axes, it is necessary that the spindle be capable of operation in spite of misalignment of these parts.

The roll neck 12 is formed with a cylindrical outer surface 14 which is interrupted by four longitudinally extending deep grooves or flutes 15 separated by four longitudinally extending heavy ribs 16. On the end of the roll neck there is provided a portion 18 which projects axially for a short distance beyond the ends of the ribs 16. This portion 18 is formed with a cylindrical outer surface 19 coaxial with the surface 14 but somewhat smaller in diameter.

Figure 2:
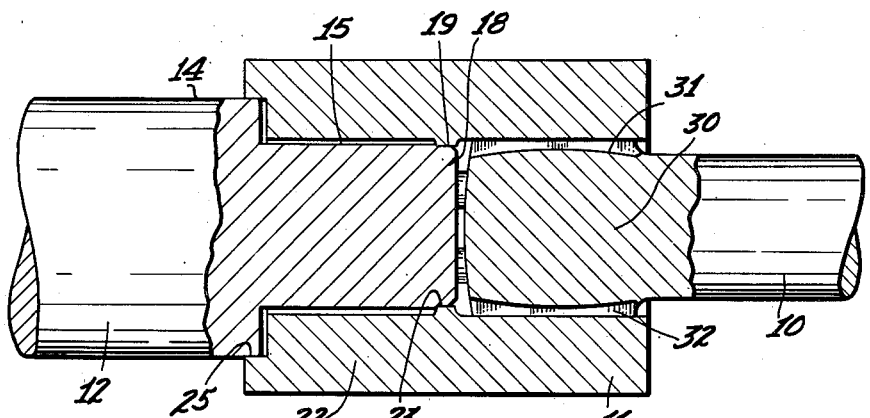
Fig. 2 is a section taken on the line 2—2 of Fig. 5.

The internal surface of the sleeve 11 is formed with four longitudinal extending deep grooves or flutes 21 separated by four longitudinally extending heavy ribs 22, the shapes and dimensions of the various parts being such that the ribs 22 will intermesh loosely with the ribs 16 on the roll neck. As best shown in Fig. 2, the ribs 22 are provided intermediate their lengths with small projections having inner surfaces 23 which are accurately finished by a suitable machining operation to conform with a cylinder having a diameter substantially equal to that of the cylindrical surface 19. The ribs 22 terminate a short distance from the end of the sleeve 11 adjacent the roll neck, as best shown in Fig. 2, to leave a projecting sleeve portion having an inner cylindrical surface 25 which is accurately finished with a diameter substantially equal to that of the cylindrical surface 14.

It will now be apparent from Fig. 2 that at assembly the surface 25 of the sleeve will engage the surface 14 of the roll neck, and the surfaces 23 will engage the surface 19 of the portion 18. Thus the sleeve will be accurately centered on the roll neck by engagement therewith in two regions which are widely spaced apart in the axial direction. With this construction the sleeve will be firmly supported against any tendency to rock in axial planes.

Any suitable means may be provided to retain the sleeve 11 in position on the roll neck 12. In the particular embodiment illustrated the roll neck is provided with a shallow circumferential groove 27 which extends across each of the ribs 16, and a screw 28 is mounted in a threaded radial hole 29 in the sleeve, the inner end of the screw entering the groove in one of the ribs.

The sleeve 11 and its ribs 22 are elongated sufficiently to extend for an appreciable distance beyond the end of the roll neck and thereby provide a socket for the reception of an enlarged head 30 on the adjacent end of the spindle 10. This head is formed with four longitudinally extending deep grooves or flutes 31 separated by four longitudinally extending heavy ribs 32. These parts are of such shapes and dimensions that the ribs 32 will intermesh loosely with the ribs 22 of the sleeve.

The coupling includes means to center the spindle head 30 accurately within the sleeve 11 while permitting universal movement of the spindle head as required to accommodate appreciable angular misalignment of the parts. For this purpose the sides of the ribs 32 are made convex, as shown in Fig. 3, and each of these ribs includes an outwardly projecting central portion or boss 35. The outer faces of these bosses 35 are convex and they are preferably accurately finished to conform at least approximately to the surface of a sphere having its center on the spindle axis. Each of the bosses 35 is in position to engage the inner end of a threaded plug 37, these plugs being mounted in correspondingly threaded radial holes 38 in the sleeve 11. The holes 38 communicate with the flutes or grooves 21. Each plug 37 has an outer head 39 which is tightened against the outer surface of the sleeve and then welded thereto at 40 (Fig. 5) to retain the plug securely in position. The inner ends of the plugs are equidistant from the axis of the sleeve, and they extend a short distance into the grooves 21, there being only a very slight clearance between the plugs and the bosses 35. By turning the outside of the sleeve to a predetermined diameter, and making the plugs 37 of a predetermined length, the correct positioning for the inner ends of the plugs may be ensured.

It will be apparent that the invention provides a wabbler coupling which is very inexpensive to manufacture and yet capable of transmitting heavy loads efficiently, quietly, and without vibration even under adverse operating conditions. The sleeve 11 is accurately and firmly supported on the roll neck 12 by reason of the engagement of the sleeve surface 25 with the surface 14, and the engagement of the sleeve surfaces 23 with the surface 19. The bosses 35 center the spindle head 30 within the sleeve by engaging the inner ends of the plugs 37, while permitting free angular movement of the spindle as required by misalignment of the driving and driven elements. These bosses are the only parts of the spindle heads which need to be accurately machined, cast surfaces being satisfactory for the other parts, which have ample clearances with respect to the sleeve. Since the bosses are on the outer surfaces of the ribs 32, they can readily be machined. Neither the grooves 21 in the sleeve nor the grooves 15 in the roll neck require accurate finishing, and they may be left as cast. The surfaces 14 and 19 on the roll neck can be machined by a simple turning operation, and the surfaces 25 and 23 on the sleeve can be machined by a simple boring operation. To disconnect the coupling it is merely necessary to remove the screw 28 and withdraw the sleeve axially over the spindle 10.

Having thus described my invention, what I claim as new and desire to secure by Letters Patent is:

1. A wabbler coupling comprising a rotatable member, a sleeve mounted on the member and projecting beyond the end thereof to provide a socket, the projecting portion of the sleeve having on its inner surface a plurality of longitudinally extending heavy ribs separated by longitudinally extending deep grooves, the sleeve having radial holes therethrough communicating with the grooves, plugs mounted in the holes with their inner ends projecting a short distance into the grooves and equidistance from the axis of the sleeve, and a rotatable spindle having an end portion located within the socket, the said end portion having on its outer surface a plurality of longitudinally extending heavy ribs separated by longitudinally extending deep grooves, the ribs on the spindle intermeshing loosely with the ribs on the sleeve, the spindle ribs having outer surfaces which engage the inner ends of the said plugs to center the end portion of the spindle within the socket.

2. A wabbler coupling as set forth in claim 1, in which the holes in the sleeve are threaded, and the plugs are correspondingly threaded.

3. A wabbler coupling as set forth in claim 2, in which the outer ends of the plugs are provided with heads to engage the outer surface of the sleeve.

4. A wabbler coupling as set forth in claim 3, in which the heads of the plugs are welded to the outer surface of the sleeve.

5. A wabbler coupling as set forth in claim 1, in which each spindle rib is shaped to provide a boss having a convex outer surface for engagement with the corresponding plug and conforming at least approximately to the surface of a sphere with its center on the spindle axis.

JOSEPH M. O'MALLEY.

No references cited.